(12) United States Patent
Fang et al.

(10) Patent No.: US 11,217,091 B2
(45) Date of Patent: Jan. 4, 2022

(54) SMART ROADSIDE UNIT AND METHOD FOR PROCESSING INFORMATION BY SMART ROADSIDE UNIT

(71) Applicant: BAIDU ONLINE NETWORK TECHNOLOGY (BEIJING) CO., LTD., Beijing (CN)

(72) Inventors: Lei Fang, Beijing (CN); Haisong Wang, Beijing (CN); Xing Hu, Beijing (CN); Sheng Tao, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/523,742

(22) Filed: Jul. 26, 2019

(65) Prior Publication Data

US 2020/0074855 A1  Mar. 5, 2020

(30) Foreign Application Priority Data

Aug. 31, 2018 (CN) .......................... 201811012972.7

(51) Int. Cl.
*G08G 1/04* (2006.01)
*H04N 5/225* (2006.01)
*G06K 9/00* (2006.01)
*H04N 5/247* (2006.01)

(52) U.S. Cl.
CPC ........... *G08G 1/04* (2013.01); *G06K 9/00785* (2013.01); *H04N 5/22521* (2018.08); *H04N 5/247* (2013.01); *G06K 2209/15* (2013.01); *G06K 2209/23* (2013.01)

(58) Field of Classification Search
CPC ...... G08G 1/04; H04N 5/22521; H04N 5/247; G06K 9/00785; G06K 2209/15; G06K 2209/23
USPC ......................................................... 348/149
See application file for complete search history.

(56) References Cited

U.S. PATENT DOCUMENTS

| | | | |
|---|---|---|---|
| 2017/0372602 A1* | 12/2017 | Gilliland | .................. G08G 1/08 |
| 2018/0048801 A1 | 2/2018 | Kiser et al. | |
| 2018/0121763 A1 | 5/2018 | Surnilla et al. | |
| 2019/0180132 A1* | 6/2019 | Grunzinger, Jr. | ... G01B 11/2755 |

FOREIGN PATENT DOCUMENTS

| | | |
|---|---|---|
| CN | 102768803 A | 11/2012 |
| CN | 203134149 U | 8/2013 |
| CN | 106128115 A | 11/2016 |
| CN | 106184787 A | 12/2016 |

(Continued)

OTHER PUBLICATIONS

European Patent Application No. 19186750.6, partial Search and Opinion dated Oct. 8, 2019, 13 pages.

(Continued)

*Primary Examiner* — Jae N Noh
(74) *Attorney, Agent, or Firm* — Lathrop GPM LLP

(57) ABSTRACT

Provided is a smart roadside unit, including: a high-bright camera assembly configured to capture a high-bright image; a low-bright camera assembly configured to capture a low-bright image, in which the high-bright camera assembly and the low-bright camera assembly have a substantially same shooting view; and a controller configured to extract vehicle information from the high-bright image and the low-bright image.

19 Claims, 2 Drawing Sheets

(56) References Cited

FOREIGN PATENT DOCUMENTS

| | | |
|---|---|---|
| CN | 106710233 A | 5/2017 |
| CN | 107403554 A | 11/2017 |
| CN | 107945540 A | 4/2018 |
| CN | 207249743 A | 4/2018 |
| CN | 108001456 A | 5/2018 |
| CN | 108010360 A | 5/2018 |
| CN | 108109393 A | 6/2018 |
| CN | 108449547 A | 8/2018 |
| CN | 110738852 A | 1/2020 |
| JP | 2005092857 A | 4/2005 |
| JP | 2009044451 A | 2/2009 |
| JP | 2010176302 A | 8/2010 |
| JP | 2014063242 A | 4/2014 |
| WO | WO 2006098356 A1 | 9/2006 |

OTHER PUBLICATIONS

Chinese Patent Application No. 201811012972.7 First Office Action dated Sep. 1, 2020, 13 pages.

Chinese Patent Application No. 201811012972.7 English translation of First Office Action dated Sep. 1, 2020, 13 pages.

Japanese Patent Application No. 2019133674 First Office Action dated Aug. 11, 2020, 3 pages.

Japanese Patent Application No. 2019133674 English translation of First Office Action dated Aug. 11, 2020, 3 pages.

\* cited by examiner

SMART ROADSIDE UNIT AND METHOD FOR PROCESSING INFORMATION BY SMART ROADSIDE UNIT

CROSS-REFERENCE TO RELATED APPLICATION

This application claims priority to and benefits of Chinese Patent Application Serial No. 201811012972.7, filed with the State Intellectual Property Office of P. R. China on Aug. 31, 2018, the entire content of which is incorporated herein by reference.

FIELD

The present disclosure relates to the field of traffic technologies, and more particularly to a smart roadside unit and a method for processing information by a smart roadside unit.

BACKGROUND

A smart roadside unit may be used in an application such as autonomous driving. As requirements for intellectualization of the smart roadside unit increase, a sensing capability of the smart roadside unit should be improved. In order to improve an active sensing capability of the smart roadside unit, the smart roadside unit may be added with different sensing detectors. However, in some scenes, if only one camera is used, vehicle identification may not be accurate enough since a light sensitivity of such a camera is an inherent feature and thus is relatively fixed.

SUMMARY

In embodiments of an object of the present disclosure, a smart roadside unit is provided, including: a high-bright camera assembly configured to capture a high-bright image; a low-bright camera assembly configured to capture a low-bright image, in which the high-bright camera assembly and the low-bright camera assembly have a substantially same shooting view; and a controller configured to extract vehicle information from the high-bright image and the low-bright image.

In embodiments of another object of the present disclosure, a method for processing information by a smart roadside unit is provided, including: capturing a high-bright image by a high-bright camera assembly and capturing a low-bright image by a low-bright camera assembly, in which the high-bright camera assembly and the low-bright camera assembly have a substantially same shooting view; extracting vehicle information from the high-bright image and the low-bright image.

In embodiments of a further object of the present disclosure, a non-temporary computer-readable storage medium is provided, having stored therein computer programs that, when executed by a processor, cause the processor to perform a method for processing information by a smart roadside unit, in which the method includes capturing a high-bright image by a high-bright camera assembly and capturing a low-bright image by a low-bright camera assembly, in which the high-bright camera assembly and the low-bright camera assembly have a substantially same shooting view; extracting vehicle information from the high-bright image and the low-bright image.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
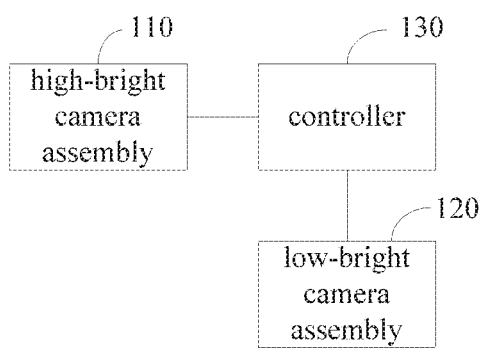
FIG. 1 is a block diagram showing a structure of a smart roadside unit according to an embodiment of the present disclosure.

Reference will be made in detail to embodiments of the present disclosure. The same or similar elements and the elements having same or similar functions are denoted by same or like reference numerals throughout the descriptions. The embodiments described herein with reference to drawings are explanatory, illustrative, and configured to generally understand the present disclosure. The embodiments shall not be construed to limit the present disclosure.

In the related art, the light sensitivity of one camera is fixed, resulting in inaccurate identification in some scenes. For example, a smart roadside unit having only one camera may be installed at a tunnel entrance, in this case, since there is a large difference in light intensity between a portion inside the tunnel and a portion outside the tunnel, an image taken by the only one camera, which is used for identification, may be not clear enough, thus causing difficulty and error in the identification.

With the smart roadside unit according the embodiments of the present disclosure, by providing two camera assemblies having different sensitivities, a high-bright image and a low-bright image may be acquired, and vehicles can be identified by combining the high-bright image and the low-bright image, thus improving identification accuracy, particularly in a scene where a large difference in light intensity exists.

A smart roadside unit and an information processing method thereof are described below with reference to the accompanying drawings.

FIG. 1 is a block diagram showing a structure of a smart roadside unit according to an embodiment of the present disclosure. As shown in FIG. 1, the smart roadside unit includes a high-bright camera assembly 110, a low-bright camera assembly 120 and a controller 130.

Specifically, the high-bright camera assembly 110 is configured to capture a high-bright image, and the low-bright camera assembly 120 is configured to capture a low-bright image, in which the high-bright camera assembly 110 and the low-bright camera assembly 120 have a substantially same shooting view. The controller 130 is configured to extract vehicle information from the high-bright image and the low-bright image.

In practice, for example in a specific scene, such as in a tunnel or out a tunnel, there is a large difference in light intensity between a portion inside the tunnel and a portion outside the tunnel. On this basis, if a smart roadside unit is installed at a tunnel entrance and one camera is used to capture an image showing the inside and the outside of the tunnel, the acquired image may have a bad quality since the illumination intensities inside and outside the tunnel are different, thus having a negative influence on the identification accuracy.

In this embodiment, the smart roadside unit includes two camera assemblies, i.e., the high-bright camera assembly 110 and the low-bright camera assembly 120, having different sensitivities but the substantially same shooting view. Specifically, the high-bright camera assembly 110 has a lower light sensitivity than the low-bright camera assembly 120, in other words, the high-bright camera assembly 110 requires a higher light level when compared with the low-bright camera assembly 120. On this basis, the low-bright camera assembly 120 may acquire a relative clear image of an object which is located under a low bright environment or a dark environment. However, if it captures an image of an object under a high bright environment, the image may have a bad quality due to overexposure. The high-bright camera assembly 110 may clearly capture objects under the bright environment, but if an object is under the dark environment, an image of such an object captured by the high-bright camera assembly 110 may be unclear.

The high-bright camera assembly 110 and the low-bright camera assembly 120 have the substantially same shooting view which refers to a substantially same shooting angle and a substantially same shooting area. In other words, the high-bright image and the low-bright image show the same area which is photographed by the camera assemblies. In a specific embodiment, the two camera assemblies are installed at the same height in a vertical direction (i.e., a perpendicular distance from a road surface to a position where a camera assembly is located), and a distance between the two camera assemblies in a horizontal direction is much smaller than a width of the tunnel or the road, such that the shooting views of the two camera assemblies are substantially same. For example, the width of the road is usually measured in meters, and the distance between the two camera assemblies is measured in millimeters, such that the shooting views of the two camera assemblies can be considered as the same.

Therefore, the controller 130 may combine the high-bright image captured by the high-bright camera assembly 110 and the low-bright image captured by the low-bright camera assembly 120 together to identify vehicle information, such as the number of the vehicles, license plate number and color of each vehicle, of the same shooting area.

Specifically, the controller 130 may extract a relative clear region from the high-bright image and extract a relative clear region from the low-bright image, so as to acquire the vehicle information in the captured area.

In the area where the large difference in the light intensity exists, with the smart roadside unit according to embodiments of the present disclosure, by providing two camera assemblies having different sensitivities but the substantially same shooting view, the high-bright image and the low-bright image of a same area may be acquired at the same time, and vehicle information may be extracted on the basis of the high-bright image and the low-bright image. Compared with an image captured by one camera, the combination of the high-bright image and the low-bright image may improve the identification accuracy.

In an embodiment of the present disclosure, when the controller 130 extracts the vehicle information from the high-bright image and the low-bright image, the controller is further configured to select a first region which is clear under high-bright environment from the high-bright image, select a second region which is clear under low-bright environment from the low-bright image, combine the first region and the second region to generate a target image, and extract the vehicle information from the target image.

Since the high-bright camera assembly 110 and the low-bright camera assembly 120 have the substantially same view, the vehicle information of the shooting area may be extracted after the two images are fused. Specifically, in the high-bright image, the region which is under the high-bright environment, i.e., a high-bright region, has a good shooting quality, and in the low-bright image, the region which is under the low-bright environment, i.e., a low-bright region, has a good shooting quality. Therefore, the controller 130 can select the high-bright region which is clear under high-bright environment from the high-bright image, select the low-bright region which is clear under low-bright environment from the low-bright image, so as to acquire the target image of the shooting area with a good shooting quality, thus extracting vehicle information from the shooting view, i.e., the area where the light intensity shows a great change.

For example, the shooting area of the high-bright camera assembly 110 and the low-bright camera assembly 120 include an area inside the tunnel and an area outside the tunnel. The controller 130 may acquire an image piece of the outside of the tunnel from the high-bright image, acquire an image piece of the inside of the tunnel from the low-bright image, combine the selected pieces and acquire the target image. On this basis, the target image shows a clear view both inside and outside the tunnel, and thus the controller 130 may extract the vehicle information inside and outside the tunnel from the target image.

In practice, the camera may be interfered by radar signals. In order to improve the quality such as sharpness of the image, in an embodiment, the smart roadside unit may further include a first shielding layer covering at least part of the high-bright camera assembly 110 and a second shielding layer covering at least part of the low-bright camera assembly 120.

However, the shielding layer may negatively affect heat dissipation, for avoiding the negative effects, in another embodiment, the first shielding layer does not cover camera lenses and heat dissipation components of the high-bright camera assembly 110, and the second shielding layer does not cover camera lenses and heat dissipation components of the low-bright camera assembly 120. In other words, the first shielding layer covers components other than the lenses and the heat dissipation components of the high-bright camera assembly 110 and the second shielding layer covers components other than the lenses and the heat dissipation components of the low-bright camera assembly 120. Therefore, the sharpness of the image may be improved without negatively affecting the function and the heat dissipation of the camera assembly.

Figure 2:
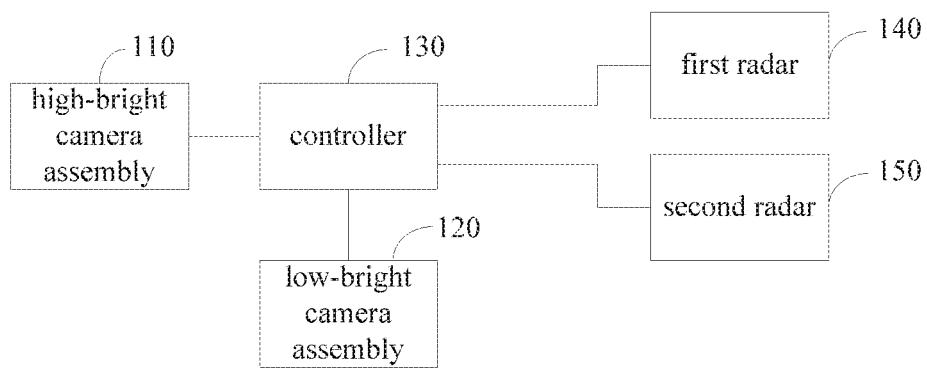
FIG. 2 is a block diagram showing a structure of a smart roadside unit according to another embodiment of the present disclosure.

FIG. 2 is a block diagram showing a structure of a smart roadside unit according to another embodiment of the present disclosure.

In order to improve the accuracy for identification, as shown in FIG. 2, besides the components shown in FIG. 1, the smart roadside unit further includes a first radar 140 and a second radar 150.

Specifically, a detection distance of the first radar 140 is greater than a detection distance of the second radar 150.

In an embodiment, the first radar 140 is disposed relatively higher than the second radar 150. In other words, a height from a road surface to a position where the first radar 140 is located is greater than a height from the road surface to a position where the second radar 150 is located. On this basis, the first radar 140 may be used to detect information of obstacles which are located in a long distance from the smart roadside unit, and the second radar 150 may be used to detect information of obstacles which are near the smart roadside unit. The obstacle information may include information such as a distance between an obstacle and the smart roadside unit, and an orientation of an obstacle.

In an embodiment, the first radar 140 and the second radar 150 are both laser radars with advantages of a high precision and a good anti-interference performance. In an embodiment, a detection distance of the first radar 140 is greater than a detection distance of the second radar 150. In practice, the first radar 140 may be a 64-line laser radar, and the second radar 150 may be a 16-line laser radar, and thus improving a detection accuracy of the first radar 140 and reducing cost of the second radar 150.

The controller 130 may accurately extract the vehicle information based on the high-bright image and the low-bright image and the obstacle information detected by the first radar 140 and the second radar 150.

Since the radars may accurately detect the vehicle information, such as distance, speed and orientation information, the vehicle information of the shooting area may be accurately extracted according to the vehicle information detected by the radars and the images captured by the camera assemblies.

In an embodiment of the present disclosure, the smart roadside unit may further include an antenna.

The smart roadside unit may send the obstacle information detected by the radars and the image captured by the camera assemblies to a server or an autonomous vehicle via the antenna.

The autonomous vehicle may receive the information sent by the smart roadside unit, and perform a corresponding control operation according to the received information, thus improving safety and reliability of the autonomous vehicle.

In order to prevent the antenna from interfering with the camera assembly, a distance between the antenna and the camera assembly is greater than a preset distance. In other words, a distance between the antenna and the high-bright camera assembly 110 or the low-bright camera assembly 120 is greater than the preset distance.

Figure 3:
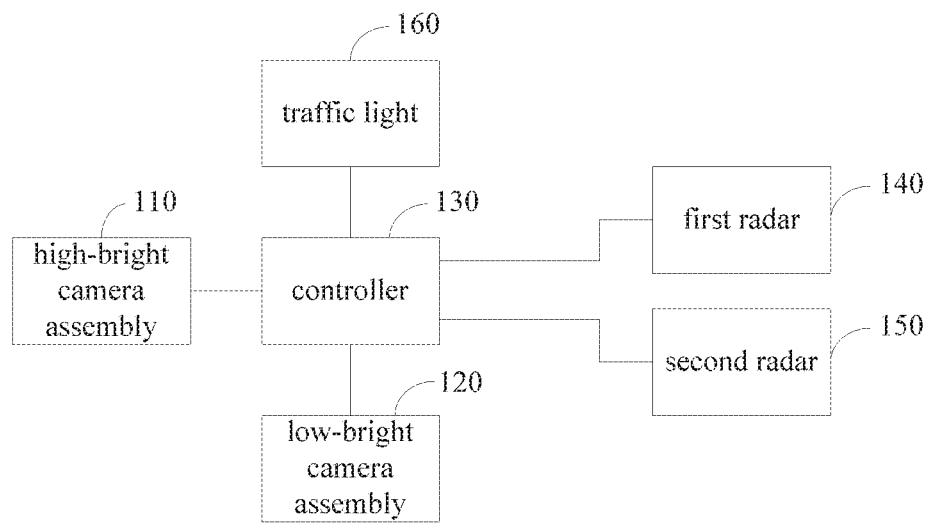
FIG. 3 is a block diagram showing a structure of a smart roadside unit according to a further embodiment of the present disclosure.

FIG. 3 is a block diagram showing a structure of a smart roadside unit according to a further embodiment of the present disclosure.

When the traffic is heavy, waiting duration of a vehicle is increased. In order to reduce the waiting duration of the vehicle, in an embodiment, as shown in FIG. 3, the smart roadside unit may further include a traffic light 160.

In this embodiment, the controller 130 may control the traffic light according to the extracted vehicle information. Specifically, the controller 130 may control the traffic light 160 according to traffic volume information. For example, if a current traffic volume is relatively large, a duration in which the light is green may be increased; if the current traffic volume is relatively small, the duration in which the light is green may be reduced.

Figure 4:
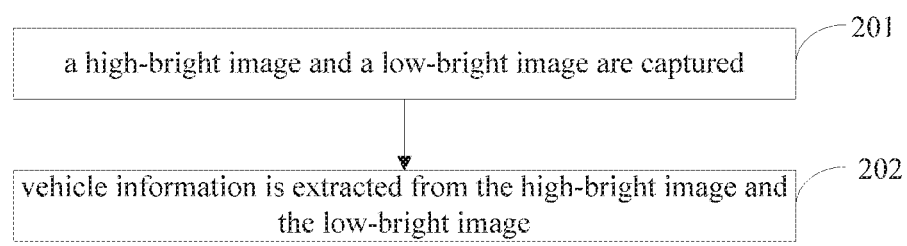
FIG. 4 is a flow chart of a method for processing information by a smart roadside unit according to an embodiment of the present disclosure.

In embodiments of the present disclosure, a method for processing information by a smart roadside unit is provided. FIG. 4 is a flow chart of a method for processing information by a smart roadside unit according to an embodiment of the present disclosure.

The method for processing information may be realized by the smart roadside unit, so as to capture images with two camera assemblies having different light sensitivities, thus improving the accuracy for identifying vehicles.

As shown in FIG. 4, the method for processing information by a smart roadside unit is described as follows.

In block 201, a high-bright image and a low-bright image are captured.

In an embodiment, the high-bright image is captured by a high-bright camera assembly and the low-bright image is captured by a low-bright camera assembly. Specifically, the high-bright camera assembly and the low-bright camera assembly have a substantially same shooting view.

In practice, for example in a specific scene, such as in a tunnel or out a tunnel, there is a large difference in light intensity between a portion inside the tunnel and a portion outside the tunnel. On this basis, if a smart roadside unit is installed at a tunnel entrance and one camera is used to capture an image showing the inside and the outside of the tunnel, the acquired image may have a bad quality since the illumination intensities inside and outside the tunnel are different, thus having a negative influence on the identification accuracy.

In this embodiment, the smart roadside unit includes two camera assemblies, i.e., the high-bright camera assembly and the low-bright camera assembly, having different sensitivities but the substantially same shooting view. Specifically, the high-bright camera assembly has a lower light sensitivity than the low-bright camera assembly, in other words, the high-bright camera assembly requires a higher light level when compared with the low-bright camera assembly. On this basis, the low-bright camera assembly may acquire a relative clear image of an object which is located under a low bright environment or a dark environment. However, if it captures an image of an object under a high bright environment, the image may have a bad quality due to overexposure. The high-bright camera assembly may clearly capture objects under the bright environment, but if an object is under the dark environment, an image of such an object captured by the high-bright camera assembly may be unclear.

The high-bright camera assembly and the low-bright camera assembly have the substantially same shooting view which refers to a substantially same shooting angle and a substantially same shooting area. In other words, the high-bright image and the low-bright image show the same area which is photographed by the camera assemblies. In a specific embodiment, the two camera assemblies are installed at the same height level in a vertical direction (i.e., a perpendicular distance from a road surface to a position where a camera assembly is located), and a distance between the two camera assemblies in a horizontal direction is much smaller than a width of the tunnel or the road, such that the shooting views of the two camera assemblies are substantially the same. For example, the width of the road is usually measured in meters, and the distance between the two camera assemblies is measured in millimeters, such that the shooting views of the two camera assemblies can be considered as the same.

In block 202, vehicle information is extracted from the high-bright image and the low-bright image.

A controller of the smart roadside unit may combine the high-bright image captured by the high-bright camera assembly and the low-bright image captured by the low-bright camera assembly together to identify vehicle information, such as the number of the vehicles, license plate number and color of each vehicle, of the same shooting area.

Specifically, the controller may extract a relative clear region from the high-bright image and extract a relative clear region from the low-bright image, so as to acquire the vehicle information in the captured area.

In the area where the large difference in the light intensity exists, with the method for processing information by the smart roadside unit according to embodiments of the present disclosure, by providing two camera assemblies having different sensitivities but the substantially same shooting view, the high-bright image and the low-bright image of a same area may be acquired at the same time, and vehicle information may be extracted on the basis of the high-bright image and the low-bright image. Compared with an image captured by one camera, the combination of the high-bright image and the low-bright image may improve the identification accuracy.

In an embodiment of the present disclosure, when the controller extracts the vehicle information from the high-bright image and the low-bright image, the controller is further configured to select a first region which is clear under high-bright environment from the high-bright image, select a second region which is clear under low-bright environment from the low-bright image, combine the first region and the second region to generate a target image, and extract the vehicle information from the target image.

Since the high-bright camera assembly and the low-bright camera assembly have the substantially same view, the vehicle information of the shooting area may be extracted after the two images are fused. Specifically, in the high-bright image, the region which is under the high-bright environment, i.e., a high-bright region, has a good shooting quality, and in the low-bright image, the region which is under the low-bright environment, i.e., a low-bright region, has a good shooting quality. Therefore, the controller can select the high-bright region which is clear under high-bright environment from the high-bright image, select the low-bright region which is clear under low-bright environment from the low-bright image, so as to acquire the target image of the shooting area with a good shooting quality, thus extracting vehicle information from the shooting view, i.e., the area where the light intensity shows a great change.

For example, the shooting area of the high-bright camera assembly and the low-bright camera assembly include an area inside the tunnel and an area outside the tunnel. The controller may acquire an image piece of the outside of the tunnel from the high-bright image, acquire an image piece of the inside of the tunnel from the low-bright image, combine the selected pieces and acquire the target image. On this basis, the target image shows a clear view both inside and outside the tunnel, and thus the controller may extract the vehicle information inside and outside the tunnel from the target image.

In practice, the camera may be interfered by radar signals. In order to improve the quality such as sharpness of the image, in an embodiment, the smart roadside unit may further include a first shielding layer covering at least part of the high-bright camera assembly and a second shielding layer covering at least part of the low-bright camera assembly.

However, the shielding layer may negatively affect heat dissipation, for avoiding the negative effects, in another embodiment, the first shielding layer does not cover camera lenses and heat dissipation components of the high-bright camera assembly 110, and the second shielding layer does not cover camera lenses and heat dissipation components of the low-bright camera assembly 120. In other words, the first shielding layer covers components other than the lenses and the heat dissipation components of the high-bright camera assembly 110 and the second shielding layer covers components other than the lenses and the heat dissipation components of the low-bright camera assembly 120. Therefore, the sharpness of the image may be improved without negatively affecting the function and the heat dissipation of the camera assembly.

In order to improve the accuracy for identification, in an embodiment of the present disclosure, the method includes: acquiring first obstacle information by a first radar, and acquiring second obstacle information by a second radar, in which a detection distance of the first radar is greater than a detection distance of the second radar.

In an embodiment, the first radar is disposed relatively higher than the second radar. In other words, a height from a road surface to a position where the first radar is located is greater than a height from the road surface to a position where the second radar is located. On this basis, the first radar may be used to detect information of obstacles which are located in a long distance from the smart roadside unit, and the second radar may be used to detect information of obstacles which are near the smart roadside unit. The obstacle information may include information such as a distance between an obstacle and the smart roadside unit, and an orientation of an obstacle.

In an embodiment, the first radar and the second radar are both laser radars having advantages of a high precision and a good anti-interference performance. In an embodiment, a detection distance of the first radar is greater than a detection distance of the second radar. In practice, the first radar may be a 64-line laser radar, and the second radar may be a 16-line laser radar, and thus improving a detection accuracy of the first radar and reducing cost of the second radar.

The smart roadside unit may accurately extract the vehicle information based on the high-bright image and the low-bright image and the obstacle information detected by the first radar and the second radar.

Since the radars may accurately detect the vehicle information, such as distance, speed and orientation information, the vehicle information of the shooting area may be accurately extracted according to the vehicle information detected by the radars and the images captured by the camera assemblies.

In an embodiment, the method further includes: sending the obstacle information detected by the radars and the image captured by the camera assemblies to a server or an autonomous vehicle via an antenna.

The autonomous vehicle may receive the information sent by the smart roadside unit, and perform a corresponding control operation according to the received information, thus improving safety and reliability of the autonomous vehicle.

In order to prevent the antenna from interfering with the camera assembly, a distance between the antenna and the camera assembly is greater than a preset distance. In other words, a distance between the antenna and the high-bright camera assembly or the low-bright camera assembly is greater than the preset distance.

When the traffic is heavy, waiting duration of a vehicle is increased. In order to reduce the waiting duration of the vehicle, in an embodiment, the method further includes: controlling a traffic light according to extracted vehicle information.

In this embodiment, the smart roadside unit may control the traffic light according to traffic volume information. For example, if a current traffic volume is relatively large, a duration in which the light is green may be increased; if the current traffic volume is relatively small, the duration in which the light is green may be reduced.

In embodiments of the present disclosure, a smart roadside unit is provided, including: a processor; and a memory for storing programs executable by the processor; in which the processor is configured to perform a method for processing information as described in above embodiments when executing the programs.

In embodiments of the present disclosure, a non-temporary computer-readable storage medium is provided, having stored therein computer programs that, when executed by a processor, cause the processor to perform a method for processing information as described in above embodiments.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance. Thus, the feature defined with "first" and "second" may include one or more this feature. In the description of the present disclosure, unless specified otherwise, "a plurality of" means two or more than two, for example, two or three.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A smart roadside unit, mounted on a roadway, comprising:
    a high-bright camera assembly configured to capture a high-bright image;
    a low-bright camera assembly configured to capture a low-bright image, wherein the high-bright image and the low-image are acquired at the high-bright camera assembly and the low-bright camera assembly have a substantially same shooting view and the high-bright camera assembly has a lower ISO sensitivity than the low-bright camera assembly; and
    a controller configured to extract vehicle information from the high-bright image and the low-bright image.

2. The smart roadside unit according to claim 1, wherein the high-bright camera assembly and the low-bright camera assembly have a substantially same shooting angle and a substantially same shooting area.

3. The smart roadside unit according to claim 1, wherein the controller is further configured to:

select a first region which is clear under a high-bright environment from the high-bright image,
select a second region which is clear under a low-bright environment from the low-bright image,
combine the first region and the second region to generate a target image, and
extract the vehicle information from the target image.

4. The smart roadside unit according to claim 1, further comprising:
a first shielding layer covering at least part of the high-bright camera assembly and
a second shielding layer covering at least part of the low-bright camera assembly.

5. The smart roadside unit according to claim 4, wherein the first shielding layer does not cover camera lenses and heat dissipation components of the high-bright camera assembly; and
the second shielding layer does not cover camera lenses and heat dissipation components of the low-bright camera assembly.

6. The smart roadside unit according to claim 1, further comprising:
a first radar, and
a second radar, wherein a detection distance of the first radar is greater than a detection distance of the second radar.

7. The smart roadside unit according to claim 6, wherein the first radar is disposed relatively higher than the second radar in a vertical direction.

8. The smart roadside unit according to claim 6, wherein the first radar and the second radar are both laser radars.

9. The smart roadside unit according to claim 1, further comprising:
an antenna, wherein a distance between the antenna and the camera assembly is greater than a preset distance.

10. The smart roadside unit according to claim 1, further comprising:
a traffic light controlled by the controller according to extracted vehicle information.

11. A method for processing information by a smart roadside unit mounted on a roadway, comprising:
capturing a high-bright image by a high-bright camera assembly and capturing a low-bright image by a low-bright camera assembly, wherein the high-bright image and the low-bright image are acquired at the same time, the high-bright camera assembly and the low-bright camera assembly have a substantially same shooting view and the high-bright camera assembly has a lower ISO sensitivity than the low-bright camera assembly;
extracting vehicle information from the high-bright image and the low-bright image.

12. The method according to claim 11, wherein extracting vehicle information from the high-bright image and the low-bright image comprises:
selecting a first region which is clear under a high-bright environment from the high-bright image,
selecting a second region which is clear under a low-bright environment from the low-bright image,
combining the image of the high-bright region and the image of the low-bright region to generate a target image, and
extracting the vehicle information from the target image.

13. The method according to claim 11, wherein a first shielding layer is provided to cover at least part of the high-bright camera assembly; and
a second shielding layer is provided to cover at least part of the low-bright camera assembly.

14. The method according to claim 13, wherein the first shielding layer does not cover camera lenses and heat dissipation components of the high-bright camera assembly; and
the second shielding layer does not cover camera lenses and heat dissipation components of the low-bright camera assembly.

15. The method according to claim 11, further comprising:
acquiring first obstacle information by a first radar, and
acquiring second obstacle information by a second radar, wherein a detection distance of the first radar is greater than a detection distance of the second radar.

16. The method according to claim 15, further comprising:
sending the obstacle information and captured images to a server or a vehicle via an antenna.

17. The method according to claim 15, wherein the first radar and the second radar are both laser radars.

18. The method according to claim 11, further comprising:
controlling a traffic light according to extracted vehicle information.

19. A non-temporary computer-readable storage medium having stored therein computer programs that, when executed by a processor, cause the processor to perform a method for processing information acquired by a smart roadside unit mounted over on a roadway, the method comprising:
capturing a high-bright image by a high-bright camera assembly and capturing a low-bright image by a low-bright camera assembly, wherein the high-bright image and the low-bright image are acquired at the same time, the high-bright camera assembly and the low-bright camera assembly have a substantially same shooting view and the high-bright camera assembly has a lower ISO sensitivity than the low-bright camera assembly;
extracting vehicle information from the high-bright image and the low-bright image.

* * * * *